United States Patent
Cichos et al.

(10) Patent No.: US 8,673,441 B2
(45) Date of Patent: Mar. 18, 2014

(54) ANTIMICROBIAL PLASTICS PRODUCT AND PROCESS FOR PRODUCTION THEREOF

(75) Inventors: Christoph Cichos, Moritzburg (DE); Irmgard Cichos, Moritzburg (DE)

(73) Assignee: Spiegelberg (GmbH & Co.) KG, Hamburg (DE)

( * ) Notice: Subject to any disclaimer, the term of this patent is extended or adjusted under 35 U.S.C. 154(b) by 446 days.

(21) Appl. No.: 12/670,629

(22) PCT Filed: Jul. 25, 2008

(86) PCT No.: PCT/EP2008/006166
§ 371 (c)(1),
(2), (4) Date: Jan. 25, 2010

(87) PCT Pub. No.: WO2009/013016
PCT Pub. Date: Jan. 29, 2009

(65) Prior Publication Data
US 2011/0015615 A1   Jan. 20, 2011

(30) Foreign Application Priority Data
Jul. 26, 2007   (DE) .................... 10 2007 035 063

(51) Int. Cl.
*B32B 27/00* (2006.01)
*B32B 27/06* (2006.01)
*A61M 25/00* (2006.01)
*C08K 3/10* (2006.01)

(52) U.S. Cl.
USPC ............. 428/323; 428/76; 428/328; 428/402; 428/432; 428/446; 428/469; 604/523; 264/328.1; 264/328.17; 264/331.11; 523/122

(58) Field of Classification Search
USPC ...................................................... 428/323
See application file for complete search history.

(56) References Cited

U.S. PATENT DOCUMENTS

| | | | |
|---|---|---|---|
| 5,976,562 A | 11/1999 | Krall et al. | |
| 2006/0134313 A1 | 6/2006 | Guggenbichler et al. | |
| 2007/0135751 A1* | 6/2007 | DiCarlo et al. | 604/19 |

FOREIGN PATENT DOCUMENTS

| | | |
|---|---|---|
| CA | 2 380 490 | 2/2001 |
| DE | 10 2005 053 295 | 5/2007 |
| EP | 0 251 783 | 1/1988 |
| JP | 07-089746 | 4/1995 |
| JP | 11-124697 | 5/1999 |
| JP | 2006-509054 | 3/2006 |
| WO | WO 95/20878 | 8/1995 |
| WO | WO 01/09229 | 2/2001 |
| WO | WO 02/13701 | 2/2002 |
| WO | WO 2004/024205 | 3/2004 |
| WO | WO 2005/042058 | 5/2005 |

OTHER PUBLICATIONS

English version of International Preliminary Report on Patentability in corresponding PCT/EP2008/006166, mailed Mar. 4, 2010.
Rompp-Chemie-Lexikon, Stuttgart 1992, "Silberphosphat," 2 pages, German (no translation available).

(Continued)

*Primary Examiner* — Callie Shosho
*Assistant Examiner* — Cheng Huang
(74) *Attorney, Agent, or Firm* — Hovey Williams LLP

(57) ABSTRACT

The invention relates to antimicrobial plastics products which comprise, as the antimicrobially active component, silver orthophosphate or particles of partly reduced silver orthophosphate. The plastics products have a very good antimicrobial efficacy. The production process achieves the effect that the plastics products, in spite of their content of silver orthophosphate or partly reduced silver orthophosphate, are not discolored under the action of light.

49 Claims, 2 Drawing Sheets

(56) References Cited

OTHER PUBLICATIONS

H. Remy, Lehrbuch der anorganischen Chemie. Akademische Verlagsgeseilschaft Geest & Portig k.-G, Leipzig 1959, vol. 2, p. 481, 1 page, German (no translation available).

Gmelin Handbuch der anorganischen Chemie, vol. B, Springer-Verlag, Berlin, Heidelberg, New York, 1974, ISBN 3-540-93209-7, 4 pages, German (no translation available).

* cited by examiner

ANTIMICROBIAL PLASTICS PRODUCT AND PROCESS FOR PRODUCTION THEREOF

RELATED APPLICATIONS

This application claims priority to PCT International Patent Application No. PCT/EP2008/006166, filed Jul. 25, 2008, which claims the priority benefit of German Patent Application No. 10 2007 035 063.7, filed Jul. 26, 2007, both of which are hereby incorporated by reference in their entirety.

The invention relates to antimicrobial plastics products and a process for production thereof. The products are in particular medical products such as for example catheters.

Plastics surfaces are readily colonized by microorganisms and in particular by bacteria. The microorganisms can attach themselves to plastics surfaces and multiply, with the result that the plastic item is covered with a film of microorganisms. Infections can be triggered through contact with a plastic item, the surface of which is colonized by microorganisms. This is generally undesirable but particularly disadvantageous when using plastics products in the medical field.

Catheters, such as e.g. central venous catheters, wound catheters, ventricular catheters, lumbar catheters, peritoneal catheters or urethral catheters are generally made from plastic. On the other hand it is known that infections can frequently be triggered through the use of microbially contaminated catheters.

In order to reduce the risk of infection, plastics are usually equipped with antimicrobial properties. Metals having an antimicrobial effect and in particular silver are used for this purpose.

In WO 95/20878 a process for producing plastic bodies is described in which polyurethane films are vapour-coated with metallic silver. The films coated with a layer of silver are then shredded. The thus-obtained material is melted and shaped into plastic bodies, in particular for medical uses.

WO 01/09229 discloses a method of producing an antimicrobial plastic body from an intermediate product. With this method, at least one component of the intermediate product is treated with a metal colloid. The plastic body is then shaped. The metal colloid is preferably colloidal silver.

In WO 2004/024205 a method for producing an antimicrobial plastics product from an intermediate product is described. With this method, the intermediate product is firstly treated with an antimicrobial metal colloid. Then a soluble or poorly soluble salt of an antimicrobial metal is added. Then the plastics product is shaped. Silver sulphate and silver phosphate are named as metal salts that can be used.

In volume 5 of the 9$^{th}$ edition of the Römpp Chemielexikon, Stuttgart 1992, on page 4159 under the headword "Silberphosphat" [silver phosphate] it says:

"$Ag_3PO_4$, mol. wt. 418.63. yellow, odourless powder, density 637, MP 849°, soluble in dilute acids, forms as yellowish precipitate from aq. soln. of orthophosphates and silver nitrate; gradually darkens in light.".

In H. Remy, Lehrbuch der anorganischen Chemie, Akademische Verlagsgesellschaft Geest & Portig k.G., Leipzig 1959, volume 2, page 481, it says about silver phosphate:

"$Ag_3PO_4$ forms as a yellowish precipitate, poorly soluble in water but readily soluble in dilute solutions, from solutions of orthophosphates with the addition of silver nitrate . . . . The compound gradually darkens in light."

According to the general expert knowledge demonstrated by the above-named passages from manuals and textbooks, silver phosphate is generally considered not to be photostable. The decomposition when exposed to light incidentally relates not only to silver phosphate but also to other silver compounds such as silver chloride, silver bromide and silver iodide and was the starting point for the development of the photographic process.

EP 0 251 783 A2 discloses antimicrobial compositions with which medical items can be coated or impregnated. The antimicrobial compositions contain an antimicrobial silver compound such as silver chloride on a support of a physiologically acceptable, synthetic oxide material in particle form with a large surface area. In EP 0 251 783 it is explained that silver compounds in antimicrobial compositions have the disadvantage that the silver, present in ionic form, is unstable in the presence of light or other radiation, with the result that it is reduced to metallic silver. The reduction to metallic silver involves a change in colour. If an item which is coated or impregnated with an antimicrobial composition which contains silver compounds which is exposed to light, it can become darker, which is a major aesthetic disadvantage. With medical items which are intended for introduction into the body, a white or essentially white appearance is often preferred. For aesthetic reasons it is not acceptable if such items darken during use. According to the teaching of EP 0 251 783 A2 the photostability of silver chloride is to be improved by coating it onto a physiologically inert, synthetic oxide support material in particle form with a large surface area.

According to the teaching of EP 0 251 783 A2 silver chloride on titanium oxide proved particularly suitable. Furthermore, in EP 0 251 783 A2 it is expressly stated that through the use of a support the photostability of silver phosphate cannot be suppressed like that of silver chloride.

It is assumed that the antimicrobial efficacy of the known silver-containing plastics products is based on the release of silver cations on the surface. If the known antimicrobial plastics products contain metallic silver, this requires the latter to firstly be converted into silver ions by oxidation. This has the disadvantage that the release of silver ions depends on ambient conditions. The oxidation of the silver can for example be impeded by reducing components in the plastics product. Relatively weak organic reductants such as e.g. polyols are already sufficient for this.

If the known plastics products contain ionic silver compounds, the silver is already present in cationic form. However, these known plastics products have the disadvantage that they become discoloured if they are exposed to light. If it is attempted, according to the teaching of EP 0 251 783, to improve photostability by applying the silver compound to a particulate oxide support material with a large surface area, the improvement is at the cost of various disadvantages. Firstly, the support material itself can delay the release of the silver ions. Secondly, the composition of a plastics product must be matched to the respective application. In this regard it is a great limitation if, to improve photostability, the presence of a particulate synthetic oxide support material is essential. Finally, through the use of a support, the photoinstability of silver phosphate cannot be suppressed like that of silver chloride, as stated in EP 0 251 783 A2.

The object of the invention is to propose an improved process for the production of an antimicrobially effective plastics product. The object also includes the creation of a novel plastics product which does not have the named disadvantages.

Figure 1:
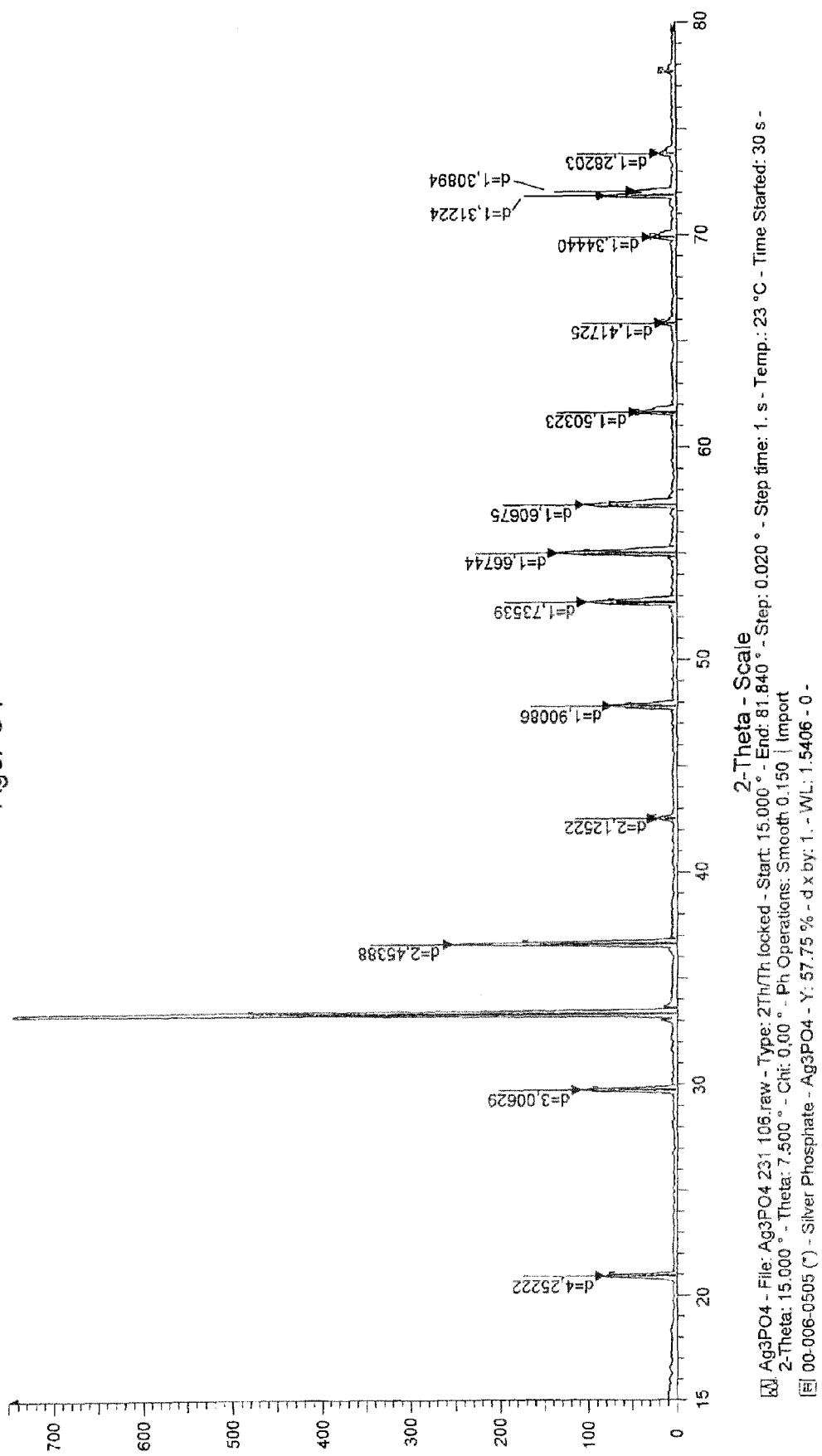
FIG. 1 is an x-ray diffraction photograph of a pure crystalline silver orthophosphate obtained by a process according to one embodiment of the invention.

According to a first embodiment of the invention the object is achieved by a process for the production of an antimicrobially effective plastics product, comprising
- (a) provision of a solution of a silver salt in aqueous ammonia,
- (b) addition of phosphoric acid accompanied by precipitation of silver orthophosphate as a solid which is kept in suspension until the pH of the suspension lies between 6.0 and 8.0,
- (c) separation of the solid,
- (d) repeated washing of the solid with portions of deionized water until the specific conductivity of the wash water after separation from the solid has a value below 50 µS/cm;
- (e) drying of the solid,
- (f) incorporation of the solid into a plastics intermediate product which has not been treated with a colloidal metal or does not contain same, and
- (g) shaping of the plastics product.

According to a second embodiment of the invention the object is achieved by a process for the production of an antimicrobially effective plastics product, comprising
- (a) provision of a solution of a silver salt in aqueous ammonia,
- (b) addition of phosphoric acid accompanied by precipitation of silver orthophosphate as a solid which is contained in suspension until the pH of the suspension lies between 6.0 and 8.0,
- (c) separation of the solid,
- (d) suspension of the solid in deionized water,
- (e) addition of aqueous ammonia to the suspension and heating of the mixture to a temperature in the range from 40-90° C., wherein the quantity of ammonia is such that, at the chosen temperature in the range from 40-90° C., 1 wt.-% to 80 wt.-% of the silver ions dissolve,
- (f) addition of a reductant at the chosen temperature in the range from 40-90° C. in a quantity which is sufficient to reduce the silver ions in solution to metallic silver, with the result that a partly reduced silver orthophosphate is formed as a suspended solid,
- (q) separation of the solid,
- (h) repeated washing of the solid with portions of deionized water until the specific conductivity of the last sample of wash water after separation from the solid has a value below 20 µS/cm;
- (i) drying of the solid,
- (k) incorporation of the solid into a plastics intermediate product which has not been treated with a colloidal metal or does not contain same, and
- (l) shaping of the plastics product.

According to a third embodiment of the invention the object is achieved by a process for the production of an antimicrobially effective plastics product, comprising
- (a) provision of a solution of a silver salt in aqueous ammonia,
- (b) addition of phosphoric acid accompanied by precipitation of silver orthophosphate as a solid which is contained in suspension until the pH of the suspension lies between 6.0 and 8.0,
- (c) separation of the solid,
- (d) suspension of the solid in deionized water,
- (e) addition of a reductant at the chosen temperature in the range from 40-90° C. in a quantity which is sufficient to reduce 1 wt.-% to 65 wt.-% of the silver orthophosphate contained in the suspension of the solid to metallic with the result that a partly reduced silver orthophosphate is formed as a suspended solid,
- (f) separation of the solid,
- (g) repeated washing of the solid with portions of deionized water until the specific conductivity at 25° C. of the last, portion of wash water after separation from the solid has a value below 20 µS/cm,
- (h) drying of the solid,
- (i) incorporation of the solid into a plastics intermediate product which has not been treated with a colloidal metal or does not contain same, and
- (k) shaping of the plastics product.

According to a fourth embodiment of the invention the object is achieved by a process for the production of an antimicrobially effective plastics product, comprising
- (a) provision of a solution of a silver salt in aqueous ammonia,
- (b) addition of phosphoric acid accompanied by precipitation of silver orthophosphate as a solid which is kept in suspension until the pH of the suspension lies between 6.0 and 8.0,
- (c) separation of the solid,
- (d) repeated washing of the solid with portions of deionized water until the specific conductivity of the wash water after separation from the solid has a value below 50 µS/cm,
- (e) suspension of the solid in deionized water,
- (f) addition of aqueous ammonia to the suspension and heating of the mixture to a temperature in the range from 40-90° C., wherein the quantity of ammonia is such that, at the chosen temperature in the range from 40-90° C., to 80 wt.-% of the silver ions dissolve,
- (q) addition of a reductant at the chosen temperature in the range from 40-90° C. in a quantity which is sufficient to reduce the silver ions in solution to metallic silver, with the result that a partly reduced silver orthophosphate is formed as a solid,
- (h) separation of the solid,
- (i) repeated washing of the solid with portions of deionized water until the specific conductivity of the last sample of wash water after separation from the solid has a value below 20 µS/cm;
- (k) drying of the solid,
- (l) incorporation of the solid into a plastics intermediate product which has not been treated with a colloidal metal or does not contain same, and
- (m) shaping of the plastics product.

According to a fifth embodiment of the invention the object is achieved by a process for the production of an antimicrobially effective plastics product, comprising
- (a) provision of a solution of a silver salt in aqueous ammonia,
- (b) addition of phosphoric acid accompanied by precipitation of silver orthophosphate as a solid which is kept in suspension until the pH of the suspension lies between 6.0 and 8.0,
- (c) separation of the solid,
- (d) repeated washing of the solid with portions of deionized water until the specific conductivity at 25° C. of the last portion of wash water after separation from the solid has a value below 50 µS/cm,
- (e) suspension of the solid in deionized water,
- (f) addition of a reductant at the chosen temperature in the range from 40-90° C. in a quantity which is sufficient to reduce 1 wt.-% to 65 wt.-% of the silver orthophosphate contained in the suspension of the solid to metallic silver, with the result that a partly reduced silver orthophosphate is formed as a suspended solid,
(g) separation of the solid,
(h) repeated washing of the solid with portions of deionized water until the specific conductivity at 25° C. of the last portion of wash water after separation from the solid has a value below 20 µS/cm,
(i) drying of the solid,
(k) incorporation of the solid into a plastics intermediate product which has not been treated with a colloidal metal or does not contain same, and
(l) shaping of the plastics product.

According to a sixth embodiment of the invention the object is achieved by a process for the production of an antimicrobially effective plastics product, comprising
(a) provision of a solution of a silver salt in aqueous ammonia solution,
(b) addition of phosphoric acid accompanied by precipitation of silver orthophosphate as a solid which is contained in suspension until the pH of the suspension lies between 6.0 and 8.0,
(c) separation of the solid,
(d) repeated washing of the separated solid with portions of deionized water until the specific conductivity at 25° C. of the last portion of wash water after separation from the solid has a value below 50 µS/cm, preferably below 20 µS/cm,
(e) drying of the solid,
(f) optionally comminuting of the dried solid,
(g) suspension of the solid in deionized water and heating of the suspension to a temperature in the range from 70° C. to 100° C.,
(h) dissolution of citrate, preferably trisodium citrate, in deionized water, and heating of the aqueous solution to a temperature in the range from 70° C. to 100° C., wherein the quantity of citrate is such that it is sufficient to reduce between 1 wt.-% and 65 wt.-% of the silver orthophosphate contained in the suspension of the comminuted solid to metallic
(i) addition of the aqueous citrate solution in one portion to the suspension and stirring of the suspension at a temperature in the range from 70° C. to 100° C. accompanied by the formation of a partly reduced silver orthophosphate as a solid, wherein the temperature is kept in the named range by the addition of heat,
(k) ending of the addition of heat and further stirring of the suspension until this has cooled to room temperature,
(l) separation of the solid,
(m) repeated washing of the solid with portions of deionized water until the specific conductivity at 25° C. of the last portion of wash water after separation of the solid has a value below 20 µS/cm,
(n) drying of the solid,
(o) incorporation of the solid into a plastics intermediate product which has not been treated with a colloidal metal or does not contain same, and
(p) shaping of the plastics product.

The plastics product according to the first embodiment contains silver orthophosphate. The plastics product according to the second, third, fourth, fifth and sixth embodiments contains partly reduced silver orthophosphate.

The second and fourth embodiments differ only in that, in the fourth embodiment, the silver orthophosphate is purified by repeated washing before the partial reduction. Through this early purification, the further process steps and in particular the final purification of the partly reduced silver orthophosphate are simplified. The fifth and third embodiments also differ in the same way.

With the second and fourth embodiments, the silver phosphate is partly dissolved before the reduction. With the third, fifth and sixth embodiments, the reductant is added directly to the aqueous suspension of the silver orthophosphate. The last procedure has proved particularly advantageous.

Within the framework of the present invention the term "solid" is used as a generic term to describe silver orthophosphate and partly reduced silver orthophosphate. For other solid materials which can be further constituents of the plastics product according to the invention, other terms are used, for example the term "filler". The term "solid" thus does not relate to such further constituents or additives unless specifically stated otherwise.

The plastics product obtainable according to the process according to the invention releases silver ions in the concentration required for the effect according to the invention over a sufficient period of time. The silver-ion concentration is high enough for antimicrobial efficacy to be reliably achieved. However, it is not so great that cytotoxic effects can occur.

The plastics products according to the invention according to the second to sixth embodiments, in particular those of the third, fifth and sixth embodiments and quite particularly those of the sixth embodiment, release silver ions in a particularly advantageous way. For the same active-ingredient concentration, i.e. in particular for the same silver content over all oxidation numbers (thus as metallic silver and in silver phosphate), these plastics products according to the invention show a much higher antimicrobial efficacy than the plastics product according to WO 2004/024205. The significantly higher antimicrobial efficacy compared with the state of the art is an essential advantage of the present invention.

WO 2004/024205 discloses the activation of colloidal silver by adding for example silver phosphate. In contrast to this, the second to sixth embodiments of the present invention start from silver phosphate, which is then activated with metallic silver.

There are considerable structural differences between the combination of colloidal silver and silver phosphate according to WO 2004/024205 (and in particular according to its examples 7 and 8) on the one hand and the partly reduced silver phosphate according to of the present invention on the other hand. The present invention allows the creation of silver phosphate particles on the surface of which metallic silver is located, wherein silver phosphate and metallic silver are found in direct contact. Such particles are not obtained according to the teaching of WO 2004/024205. The named differences in the structure result from the different procedures.

In example 7 of WO 2004/025204 metallic silver is precipitated on the filler barium sulphate. Then silver orthophosphate is precipitated. In this way barium sulphate coated with metallic silver and free silver orthophosphate is produced.

In the production of the partly reduced silver orthophosphate according to the present invention firstly the silver orthophosphate is precipitated. No filler is present in this precipitation. The following reduction creates the direct silver phosphate-silver contact and thus microscopic electrochemical half-elements. A consequence of this particular structure the much improved antimicrobial activity.

With plastics products which contain the partly reduced silver phosphate according to the invention, a surprisingly high initial speed of the silver release is also observed. This is desirable in particular in clinical applications, in order that germs introduced during implantation are rapidly killed off. Compared with plastics products according to WO 2004/024205 the infection rate during implantations can be considerably reduced. If it were wished, with plastics products according to WO 2004/024205, to achieve a comparable initial speed of silver release and thus a comparably rapid onset of antimicrobial efficacy, the silver concentration would have to be increased until the position with regard to cytotoxicity would no longer be acceptable.

The plastics products according to the invention have good photostability. This is particularly surprising in view of the disclosure of EP 0 251 783 A2, in which it is stated that, according to the teaching of this document, the photostability of silver phosphate cannot be improved as much as that of silver chloride.

An essential advantage is that it is not necessary with the process according to the invention to apply the silver phosphate to an inorganic support material in order to achieve the photostability of the silver phosphate. Rather, according to the invention it is particularly preferred that the silver phosphate or the partly reduced silver phosphate is not applied to an inorganic support material and in particular not to a physiologically inert inorganic oxide material such titanium dioxide or more generally oxides of titanium, magnesium, aluminium, silicone, cerium, zirconium, hafnium, niobium and tantalum or to calcium hydroxylapatite or barium sulphate. Accordingly, the plastics products according to the invention are preferably free from an inorganic support material for the silver phosphate or the partly reduced silver phosphate and in particularly free from the above-named support materials. According to an embodiment, in the process according to the invention the above-named support materials are not used at all, i.e. neither as support material nor as an additive such as for example as a filler. In this case the plastics products according to the invention are free from oxides of titanium, magnesium, aluminium, silicone, cerium, zirconium, hafnium, niobium and tantalum as well as calcium hydroxylapatite and barium sulphate.

The improvement in photostability achieved according to the invention is achieved by repeated washing of the silver orthophosphate or of the partly reduced silver orthophosphate until the specific conductivity of the final sample of wash water has, after separation of the solid, a value below 50 µS/cm in the case of the silver orthophosphate or a value below 20 µS/cm in the case of the partly reduced silver orthophosphate. It is surprising that a satisfactory photostability can be achieved with the help of a washing process controlled in this way.

Within the framework of the present invention the term "plastics product" is used such that it relates to semi-finished products and ready-to-use products the surface of which consists, at least partly, of the plastic according to the invention. The whole of the plastics product can consist of the plastic according to the invention. The invention is not, however, limited to such plastics products.

According to all embodiments of the invention, firstly a solution of a silver salt in aqueous ammonia is produced. For this purpose, any silver salt with adequate water solubility can be used. A preferred silver salt is silver nitrate.

Silver orthophosphate is precipitated from this solution by adding phosphoric acid. This precipitation is carried out in a way known to a person skilled in the art such that the silver orthophosphate is kept in suspension. The suspended solid silver orthophosphate particles have the small particle size desired according to the invention. The silver ions can be particularly well released in the plastic from the small particles. Phosphoric acid is added for the precipitation of the silver orthophosphate until the pH of the suspension lies between 6.0 and 8.0.

The silver orthophosphate is then separated from the suspension. The separation takes place preferably by centrifuging.

According to the first embodiment of the invention the silver orthophosphate is then repeatedly washed with portions of deionized water. For this purpose the silver orthophosphate is firstly preferably dispersed in ultra-pure water for every washing and then separated again by centrifuging. The washings are repeated as often as needed for the specific conductivity of the wash water after separation of the solid to have a value below 50 µS/cm.

The specific electric conductivity is the reciprocal of the specific resistance. The unit is $(\Omega\,cm)^{-1}$ or S/cm. Here, $S=1/\Omega$ is the short form for Siemens, the unit of electrical conductance which is defined as the reciprocal of the electrical resistance. The electric conductivity depends on the temperature and in the case of ion conductors on the concentration, the degree of dissociation and the solvent. For the purposes of the present invention the electric conductivity refers to the reference temperature 25° C.

Conductivity-measuring devices are also called conductometers. Conductometers suitable according to the invention are available in the trade under the names Sartorius PP-20 and Sartorius PP-50. The manufacturer is Sartorius AG, Weender Landstraße 94-108, Göttingen, Germany. The PY-CO1-PY-CO3 measurement cells offered for sale by Sartorius AG for these conductometers are four-electrode measurement cells with platinum electrodes. The conductivity measurement is carried out with these conductometers applying an alternating voltage or an alternating current. The most common frequency is 50 Hz.

The silver orthophosphate, adequately purified by repeated washing, is then dried. The drying can take place in any manner, for example in a drying oven. The thus-obtained dried silver orthophosphate is then suitable for incorporation into a plastics intermediate product.

The term "plastics intermediate product" denotes, within the framework of the present invention, materials from which pre-shaped plastics parts or the "plastics product" can be produced by shaping. The plastics intermediate product can for example be present in the form of granules or pellets or as a powder. The plastics intermediate product can be a single-component system in which one component can be transformed into a pre-shaped plastic part by shaping. The plastics intermediate product can, however, also be a multi-component system, in which the components can firstly be mixed together immediately before shaping and a curing of the plastic takes place during shaping or after shaping. Fillers or additives are not plastics intermediate products within the meaning of the present invention.

An essential constituent of the plastics intermediate product are polymeric compounds, in particular those which are ordinarily used in the medical field.

Preferred polymers are polyurethanes, polycarbonates, silicones, polyvinylchloride, polyacrylates, polyesters, polyolefins, polystyrene and polyamides. Polyethylene, polypropylene, cross-linked polysiloxanes, (meth)acrylate-based polymers, cellulose and cellulose derivatives, ABS, tetrafluoroethylene polymers, polyethylene terephthalates and the corresponding copolymers can be used as polymeric compounds. As examples of copolymers suitable according to the invention, styrene-acrylonitrile copolymers and copolymers of ethylene and a higher α-olefin are named.

In addition to one or more polymeric materials the intermediate product can comprise additives. Additives can for example be inorganic or organic substances. The intermediate product can comprise in particular all inorganic and also organic substances which are inert and medically acceptable. These include in particular materials poorly soluble in water such as zirconium dioxide, zirconium silicate, titanium dioxide, zinc oxide, calcium fluoride, calcium carbonate, aluminosilicates, hydroxylapatite, fluorapatite, barium sulphate, calcium sulphate and carbon in its various forms. Such substances can already be contained as fillers in a commercially obtainable plastics intermediate product, or else they can be added as a further component to a commercially obtainable plastics intermediate product within the framework of the present invention and incorporated into the plastics intermediate product.

The plastics intermediate product can also contain further additives, such as e.g. pigments, antioxidants, plasticizers, photostabilizers for the polymer etc.

According to the second embodiment of the invention, as with the first embodiment, firstly a suspension of silver orthophosphate is produced. The silver orthophosphate is then separated and suspended again in deionized water. Then aqueous ammonia is added to the suspension. The mixture is heated to a temperature in the range from 40-90° C. The quantity of ammonia is such that, at the chosen temperature in the range from 40-90° C., a quantity of 1 wt.-% to 80 wt.-% of the silver present in the mixture or of the silver ions present in the mixture dissolves.

Through the transfer into solution the silver ions are to be made available in a larger quantity for the following reduction step. On the one hand the dissolved silver ions are available for the reduction. On the other hand the reduction can naturally also take place on the surface of the suspended particles.

The reductant is added at the chosen temperature in the range from 40-90° C. in a quantity which is sufficient to at least reduce the silver ions in solution to metallic silver. Naturally, a certain surplus of reductant can be used. The quantity of reductant is preferably large enough to reduce both the silver ions found in solution and also the silver ions found on the surface of the suspended particles.

The quantity of metallic silver produced can be controlled via the use of ammonia and reductant. The colour of the produced solid is thus simultaneously set.

It is assumed that with the process according to the second and fourth embodiments of the invention metallic silver particles are deposited on silver phosphate. More generally, with the process according to the second to sixth embodiments particles are formed which consist partly of silver orthophosphate and partly of metallic silver. Many microscopic electrochemical half-elements $Ag/Ag_3PO_4$ thereby form, the potentials of which depend only on the phosphate-ion concentration in the surrounding aqueous phase. It can be shown thermodynamically that the free enthalpy for the reaction $Ag^0 \rightarrow Ag^+ + e$ is thereby shifted into the negative range and the reduction of silver ions to silver thus made more difficult.

Figure 2:
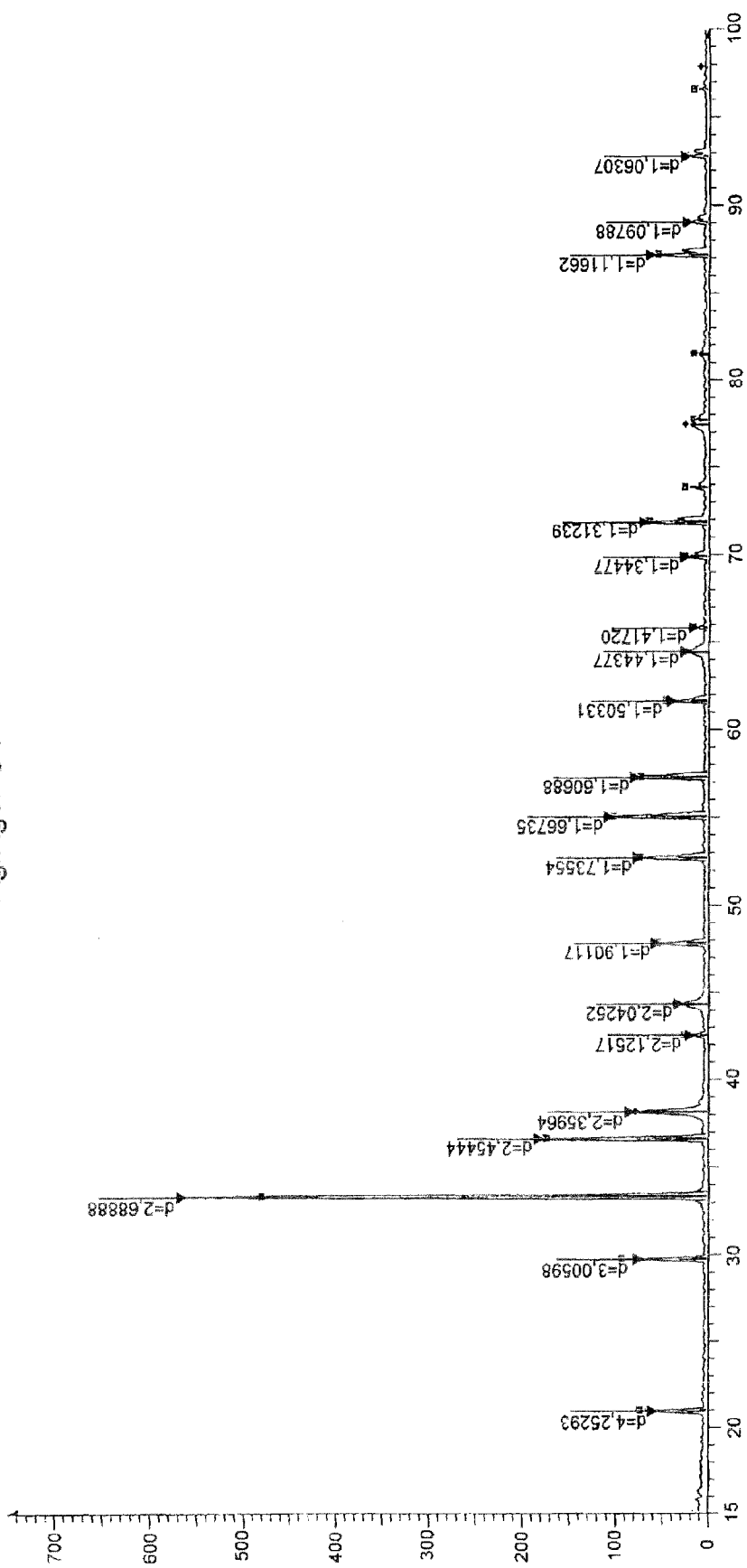
FIG. 2 is an x-ray diffraction photograph of a partially reduced silver orthophosphate obtained by a process according to one embodiment of the invention.

The product of the reduction is called partly reduced silver orthophosphate. FIG. 2 shows an X-ray spectrum of such a partly reduced silver orthophosphate. Both peaks for silver orthophosphate and bands for metallic silver are to be seen in the X-ray spectrum.

Different reductants can be used for the reduction step. Preferred reductants are various sugars, aldehydes, hydroquinone, tartaric acid, salts of citric acid (citrates) and hydrazine. A particularly preferred reductant is glucose.

As already mentioned there is only a small difference between the second and the fourth embodiments of the invention. According to the fourth embodiment the silver orthophosphate is washed before the partial reduction until it satisfies the purity criterion according to the first embodiment, i.e. until it has a conductivity below 50 µS/cm.

As already discussed, the quantity of reductant is to be such that the silver ions found in solution are reduced to metallic silver. However, under certain circumstances small quantities of silver ions can remain in the solution, wherefore it is preferred that, before the separation of the partly reduced orthophosphate, phosphoric acid is added to the suspension in order to set a pH in the range from 6.0 to 8.0. Any silver ions found in solution are thereby converted into silver orthophosphate and precipitated out of the solution in suspension.

The partly reduced silver orthophosphate is purified in exactly the same way by repeated washing as the purification of the pure silver orthophosphate. However, according to the invention it is provided that the conductivity of the last wash water in the case of partly reduced silver orthophosphate is below 20 µS/cm.

With the third and fifth embodiments the partial reduction is carried out without previously dissolving some silver orthophosphate with the help of ammonia. Here, the reduction is exclusively heterogeneous, i.e. the reductant in solution reacts with the silver orthophosphate present as suspended solid. The quantity of reductant is in this process chosen with regard to the quantity of suspended silver orthophosphate such that some of the silver orthophosphate present is reduced to metallic silver. A quantity of reductant is used which, according to the stoichiometry of the reduction, is suitable for reducing 1 wt.-% to 65 wt.-% of the suspended silver orthophosphate to metallic silver. If the quantity of reductant lies in this range, then a partly reduced silver orthophosphate is created which generally has a surplus of silver ions of the silver orthophosphate over silver atoms of the metallic silver and in every case not more than one silver atom per silver ion.

The process according to the sixth embodiment is similar to that of the fifth embodiment and relates to a particularly preferred procedure. Here, citrate i.e. a salt of citric acid, preferably trisodium citrate is used as reductant which also acts as dispersant for the suspended solid, as a result of which, in cooperation with the remaining features of this procedure, a product with particularly advantageous properties is created. The reduction is carried out at a temperature of 70° C. to 100° C., preferably 90° C. to 100° C. The silver orthophosphate formed in the first part of the process is optionally comminuted before the reduction, in particular in order to convert agglomerates which may have formed during drying back into small, discrete particles.

With the process according to the invention exclusively ultra-pure water is preferably used. Ultra-pure water can for example be obtained by distillation over a multi-tray column. Ultra-pure water can however also be obtained by deionization. The conductivity of the ultra-pure water is very low and lies in every case below 5 µS/cm.

Silver phosphate is made available by the invention as a means of giving plastics antimicrobial properties, wherein the thus-endowed plastics do not have the problem of photoinstability. In particular it is not necessary that the silver orthophosphate is applied to a support before being incorporated into the plastics intermediate product. According to a procedure preferred according to the invention, the silver orthophosphate or the partly reduced silver orthophosphate is added directly to the plastics intermediate product without previously having been applied to an inorganic support material or an inorganic filler or having been mixed with same.

On the other hand, however, nor is the invention limited to filler-free plastics products. Many commercially available plastics intermediate products already contain a filler and further additives such as e.g. antioxidants, pigments, plasticizers etc. The invention also includes processes in which plastics intermediate products which already contain inorganic fillers are used.

It is also possible according to the invention that the dried silver orthophosphate or the dried partly reduced silver orthophosphate is firstly mixed with an inorganic filler before the mixture is incorporated into the plastics intermediate product. This can for example be expedient for preventing the formation of agglomerates if the silver orthophosphate or the partly reduced silver orthophosphate is to be stored for an extended period before further processing.

The invention also includes processes in which additionally at least one further material poorly soluble in water is incorporated into the plastics intermediate product. The further material can for example be zirconium dioxide, zirconium silicate, titanium dioxide, zinc oxide, calcium fluoride, calcium carbonate, an aluminosilicate, hydroxylapatite, fluorapatite, barium sulphate, calcium sulphate or carbon in one of its forms, for example graphite. A possible procedure is that firstly the silver orthophosphate or the partly reduced silver orthophosphate is incorporated in the plastics intermediate product and the further material is then incorporated into the plastics intermediate product. However, it is also possible to firstly mix the silver orthophosphate or the partly reduced silver orthophosphate with the poorly-soluble material and then incorporate this mixture into the plastics intermediate product.

If the plastics intermediate product is a two-component system, the silver orthophosphate or the partly reduced silver orthophosphate can firstly mixed into one component before the second component is added.

Various processes are available to the person skilled in the art for the incorporation of the silver orthophosphate, the partly reduced silver orthophosphate and optionally the further material poorly soluble in water. The incorporation takes place preferably with the help of a mixer, stirrer, kneader, roll mill or extruder.

The silver orthophosphate or the partly reduced silver orthophosphate are preferably incorporated into the plastics intermediate product in a quantity of 0.1 wt.-% to 10 wt.-%, in particular 0.5 wt.-% to 5 wt.-% and most preferably 1 wt.-% to 3 wt.-%, based rn the total weight of the plastics product.

When all the desired components have been incorporated into the plastics intermediate product, the plastics product is shaped from this. The shaping preferably takes place by extrusion, injection moulding, pressing or hot pressing.

Extrusion is a special case inasmuch as it can be used on the one hand for the incorporation of solids into the plastics intermediate product and on the other hand for the shaping of the plastics product. By choosing a suitable extruder the incorporation of solids into the plastics intermediate product and the shaping of the plastics product can thus be carried out with the help of the same apparatus.

The plastics products according to the invention are novel because of their composition and because of their photostability. The most varied products can be formed.

Examples of medical products are venous catheters, peripheral venous catheters, Sheldon catheters, Hickman-type catheters, port catheters, wherein at least the port chamber consists of the material produced according to the invention, expediently also all further constituents of the same, ventricular catheters, lumbar catheters, peritoneal catheters, bladder catheters, nephrostomy catheters, urethra stents, thorax drainage systems and the connected suction system, endotracheal tubes, toothbrushes (bristles and handles), surgical suture material, fibre material for producing antimicrobial textiles, materials for antimicrobial coating, e.g. of tubes for breathing, antimicrobial wound covers and dressings for burns injuries.

The invention is, however, not limited to medical applications. Antimicrobial properties are also desired in plastics products which are touched by different people. Examples of such products are telephone receivers, door handles or computer keyboards.

The plastics products according to the invention can be obtained according to the various embodiments of the process according to the invention.

The plastics product according to the invention contains either silver orthophosphate and is free from colloidal metal; or it contains partly reduced silver orthophosphate and is free from colloidal metal.

According to the latter embodiment the plastics product according to the invention contains plastic and partly reduced silver orthophosphate distributed therein, which consists of silver orthophosphate particles which have been partly reduced to metallic silver. There is a direct contact in the particles between silver orthophosphate and metallic silver. The surface of the particles consists partly of silver orthophosphate and partly of metallic silver.

The partly reduced silver orthophosphate preferably has a ratio of silver ions of the silver orthophosphate to silver atoms of the metallic silver in the range from 95:5 to 55:45, i.e. the silver ions are in surplus compared with the silver atoms.

The size of the particles of partly reduced silver phosphate can for example be measured by laser diffraction. The measurement can take place according to DIN ISO 13320-1: 1999-11. Where particle sizes are named below and in the claims, these are to be understood to be particle sizes as measured by laser diffraction, in particular according to DIN ISO 133320-1:1999-11. A suitable measurement apparatus is for example available in the trade under the name "SYMPATEC HELOS (H2023) & SUCELL".

Preferably 95 wt.-%, in particular 98 wt.-% and most preferably 99 wt.-% of the particles have a size in the range from 0.5 to 50 μm. This is the range for the absolute sizes of the particles (and not a range for average values).

Different forms of particle-size distribution are known to a person skilled in the art. The particle-size distribution can be monomodal, bimodal or multimodal, i.e. it can have one maximum or several maxima. Preferably it is a normal distribution (Gaussian distribution) with a maximum or a distribution which corresponds approximately to a normal distribution. The maximum preferably lies in the range from 2 to 20 μm, in particular 3 to 12 μm and most preferably 4 to 10 μm.

The invention also relates to a plastics intermediate product which contains plastic and partly reduced silver orthophosphate distributed therein, which consists of silver orthophosphate particles which have been partly reduced to metallic silver with the result that there is a direct contact in the particles between silver orthophosphate and metallic silver and the surface of the particles consists partly of silver phosphate and partly of metallic silver. The plastics product can be produced from this plastics intermediate product by shaping. The above statements concerning the silver orthophosphate contained in the plastics product also apply to the silver orthophosphate contained in the plastics intermediate product.

Both in the plastics product and in the plastics intermediate product, the plastic preferably comprises polyurethane, polycarbonate, silicone, polyvinylchloride, polyacrylate, polyester, polyolefin, polystyrene or polyamide.

The plastics product according to the invention can consists exclusively of plastic equipped with antimicrobial properties as can be obtained according to a process according to the invention, and in particular of plastic equipped with antimicrobial properties which contains plastic and partly reduced silver orthophosphate distributed therein.

The plastics product can, however, also be constructed such that at least part of the same consists of the plastic equipped with antimicrobial properties and at least another part of the same consists of another material. The other material can be selected from metals, glass, ceramics and plastics.

exposed to light, were compared. For this, the total silver content and the ionic silver content of the samples were measured analytically. The samples exposed to light had been exposed to daylight over 8 weeks outdoors. The results are reproduced in Table 1:

TABLE 1

Analytical silver contents before and after exposure to light of the samples

| Sample | After lighting | | Without lighting | |
|---|---|---|---|---|
| | Total Ag/% | $Ag^+$/% | Total Ag/% | Ag+/% |
| $Ag_3PO_4$ | 78.89 +/− 1.41 | 78.83 +/− 1.61 | 80.58 +/− 5.96 | 78.38 +/− 0.08 |
| 10% $Ag_3PO_4$ on $BaSO_4$ | 7.67 +/− 0.10 | 7.92 +/− 0.20 | 7.62 +/− 0.07 | 7.80 +/− 0.08 |

The plastics product can be constructed such that its surface consists at least partially of plastic equipped with antimicrobial properties and at least partially of other material. Alternatively, the plastics product can be constructed such that the plastic equipped with antimicrobial properties encloses the other material, with the result that the surface of the product consists exclusively of this plastic.

The invention is described in detail below with reference to examples.

EXAMPLE 1

Production of Silver Orthophosphate

A three-necked flask with a glass stirrer was used in a water bath. 700 ml ultra-pure water (deionized water) was introduced into the flask and 121.7 g $AgNO_3$ dissolved therein. 120 ml of a 25% $NH_3$— solution was added to the solution. The initial brown precipitate was completely dissolved again.

The contents of the flask were heated to 60° C. After the final temperature was reached, dropwise addition of 200 ml of a 4-molar $H_3PO_4$ solution from a dropping funnel began. A yellowish precipitate, which initially dissolved again, but remained stable as the pH fell, formed at the dropping point.

Once the addition of phosphoric acid had finished, the pH was measured. It was within the range from 6.0 to 6.8. By adding a drop of phosphoric acid to the clear filtrate it was shown that the precipitation was complete.

After cooling the solid was separated from the thus-obtained suspension by centrifuging. The solid was then dispersed again in a large volume of deionized water. The solid was separated again from this aqueous suspension. This washing process was repeated several times. The last wash filtrate had an electric conductivity below 50 µS/cm.

The washed solid was then dried at 80 to 90° C. in a circulating air drying oven.

An X-ray diffraction photograph of the obtained solid is shown in FIG. 1. It is a pure crystalline silver orthophosphate.

EXAMPLE 2

Testing Resistance to Light

The silver orthophosphate produced according to example 1 was exposed to daylight outdoors over 5 months both in dry form and in a suspension in normal tap water in glass vessels or PE vessels. No change in colour was observed.

Samples of pure silver orthophosphate and samples of 10% silver orthophosphate on barium sulphate, exposed and not The error ranges given in the Table are calculated from repeat measurements. The theoretical silver content in $Ag_3PO_4$ is 77.31 wt.-%.

If glucose is added as reductant to the tap water for the suspension of the silver orthophosphate, after only two hours' exposure to light, the expected surface area reduction is to be observed in a colour shift to green. One possibility for preventing such surprising colour changes in plastics products which contain reducing substances was found in the partial reduction of the pure silver orthophosphate according to the second and third embodiments of the invention.

EXAMPLE 3

Partial Reduction of $Ag_3PO_4$ 5 g $Ag_3PO_4$ was suspended in 150 ml ultra-pure water. The $Ag_3PO_4$ was dried material which had been produced according to the process according to example 1. After adding 1.7 ml 25% $NH_3$ solution, the suspension was heated to 60° C. 1.1 g glucose monohydrate was dissolved in 150 ml ultra-pure water, transferred into a dropping funnel and after reaching the temperature of 60° C. slowly added dropwise to the suspension. The dropping time was between 1.5 and 2 hours.

After the reduction had ended, a blue-grey suspension had formed. The pH was between 8 and 9. There was a clearly perceptible release of ammonia during the reduction.

Phosphoric acid was added to the suspension in order to set the pH at a value in the range from 6 to 6.8. The colour changed from blue-grey to green-brown.

The solid was separated from the liquid, dispersed again in ultra-pure water and separated again. The solid was separated by centrifuging. The washing process was repeated four times. The electric conductivity of the last filtrate (wash water) was <20 µS/cm. The solid was then dried.

The following values were ascertained by chemical analysis of the composition:

$Ag^+$ content: 58.02 wt.-%
$Ag^0$ content: 19.68 wt.-%

An X-ray diffraction photograph of this product is shown n FIG. 2. In addition to peaks for silver orthophosphate, bands for metallic silver can also be seen.

EXAMPLE 4

Silver Release from Silver Orthophosphate at Different pH Values 40 ml ultra-pure water was introduced into each of three Erlenmeyer flasks. The starting pH values $pH_0$ shown in Table 2 below were set. 1 g silver orthophosphate was then added in each case. The Erlenmeyer flasks were sealed and shaken for three hours at room temperature. The final pH and the silver concentration were then measured in the clear filtrate.

TABLE 2

Silver release from $AG_3PO_4$ at different pH values

| Version no. | $pH_{start}$ | $pH_{end}$ | Ag conc. mg/l |
|---|---|---|---|
| 1 | 9.15 | 7.44 | 6.8 |
| 2 | 3.77 | 7.40 | 26.4 |
| 3 | 5.20 | 7.40 | 10.0 |

With a starting pH of 3.77 an increased solubility is observed. (Without a hydrolytic effect the concentration should be 5 mg/l.)

This situation is to be borne in mind when using the plastics product according to the invention in an acid environment. It is also to be borne in mind that silver phosphate has a buffer effect. The release of silver ions from the plastics products according to the invention will naturally be much lower than the silver release in this example.

EXAMPLE 5

Release of Silver Ions from Silicone Plastic

A pure silver orthophosphate produced according to Example 1 was incorporated into a commercially obtainable silicone plastics intermediate product. The silicone plastic intermediate product then obtained 1 wt.-% silver phosphate corresponding to 0.77 wt.-% silver. The intermediate product was shaped into a film. The film was cut into small strips.

5.02 g of these small strips were shaken in 50 ml deionized water in a sealed glass vessel (overhead shaker). After the elution times given in Table 3 below, to determine the silver, 10 ml was taken in each case from the vessel and the volume removed replaced by fresh deionized water before the following shaking period.

TABLE 3

Silver release from silicone plastic in deionized water

| Elution time h | Measured Ag concentration µg/l | Eluted Ag total quantity µg | Elution rate µg/h |
|---|---|---|---|
| 0 | 0 | 0 | 0 |
| 2 | 161 | 8.05 | 4.03 |
| 4 | 167 | 9.96 | 1.00 |
| 6 | 171 | 11.83 | 0.94 |
| 8 | 164 | 13.19 | 0.68 |
| 72 | 393 | 26.28 | 0.20 |

After an initial rapid release of silver ions (release from the surface regions) a following phase with slower release was observed. After 72 hours only approx. 0.07 wt.-% of the total silver quantity present in the plastic has been eluted. Therefore it can be assumed that the antimicrobial effect will last a very long time.

EXAMPLE 6

Silver Release from Thermoplastic Polyurethane

Silver orthophosphate produced according to Example 1 was firstly mixed with barium sulphate. The thus-obtained mixture was incorporated into a plastics intermediate product made of thermoplastic polyurethane. After incorporation, the polyurethane intermediate product contained 20 wt.-% barium sulphate and 6 wt.-% silver orthophosphate.

A corresponding plastic intermediate product was produced using a partly reduced silver orthophosphate produced according to Example 3. This plastic intermediate product contained 20 wt.-% barium sulphate and 6 wt.-% partly reduced silver orthophosphate according to Example 3.

The two intermediate products were extruded respectively to produce strips 3.5 cm wide and 0.5 mm thick.

In each case, 7.7 g of the strips cut into several pieces (surface area 280 cm$^2$) were shaken in 100 ml ultra-pure water in sealed vessels in an overhead shaker. After specific times, all of the liquid was separated and the silver content determined in the liquid. The plastics samples were then shaken again afresh in a fresh quantity of water.

The total quantity of releasing silver was calculated from the analyzed silver contents in relation to the elution time. The results are shown graphically in FIG. 3.

The silver-release rate, i.e. the silver released per time unit, was also calculated. The results are shown graphically in FIG. 4.

An open system which is characteristic of flow-through processes should be simulated with the help of this method.

As expected, the silver release reduces with time. It is striking that the polyurethane with partly reduced silver orthophosphate in the initial phase displays a higher release than the polyurethane with pure silver orthophosphate. After a certain time, the silver-release rates of the two compared samples come closer.

EXAMPLE 7

Antimicrobial Efficacy of Catheter Tube Materials made of Silicone 6 parts by weight of silver orthophosphate produced according to Example 1 were mixed with 94 parts by weight barium sulphate. The mixture contained 4.6 wt.-% Ag$^+$. The mixture was incorporated into a silicone plastics intermediate product. The plastics intermediate product then contained 20 wt.-% of the mixture of barium sulphate and silver orthophosphate. A catheter tube material was shaped. This is called material 1 below. It is a plastics product according to the invention.

Partly reduced silver orthophosphate was incorporated into a silicone plastics intermediate product. The partly reduced silver orthophosphate contained 67.3 wt.-% Ag$^+$ and 10.4 wt.-% Ag$^0$. The plastics product contained 2 wt.-% of the partly reduced silver orthophosphate. A catheter tube material was shaped. This is called material 2 below. It is a plastics product according to the invention.

Material 3 is not according to the invention and is used for the purposes of comparison. It is a catheter tube material which contained 20 wt.-% of an additive comprising barium sulphate, 5 wt.-% Ag$^0$ and 5 wt.-% silver orthophosphate, based on the additive (5 wt.-% Ag$^0$ and 3.85 wt.-% Ag$^+$). When producing the additive, the barium sulphate had been firstly treated with colloidal silver and then mixed with the silver orthophosphate.

Material 4 is not a material according to the invention, but a zero sample used for the purposes of comparison. Material 4 is a catheter tube material comprising silicone without any silver-containing additive.

The antimicrobial efficacy of these four different catheter tube materials is shown in Table 4 below.

TABLE 4

Antimicrobial efficacy of catheter tube materials (silicone)
Starting germination number: $10^7$/ml E. coli

| Material | Bacterial growth after | | | | | | | |
|---|---|---|---|---|---|---|---|---|
| | 3 h | 5 h | 10 h | 15 h | 20 h | 25 h | 30 h | 35 h |
| 1 | 5+ | 1+ | 1+ | 0 | 0 | 0 | 0 | 0 |
| 2 | 5+ | 1+ | 1+ | (1+) | 0 | 0 | 0 | 0 |
| 3 | 5+ | 1+ | 0 | 0 | 0 | 0 | 0 | 0 |
| 4 | 5+ | 5+ | 4+ | 4+ | 4+ | 4+ | 4+ | 4+ |

The figures in the Table have the following meaning:
5+ roll-out surface overgrown
4+ roll-out surface strong growth
3+ roll-out surface growth
2+ roll-out surface weak growth
1+ roll-out surface isolated growth
(1+) only one colony
0 roll-out surface no growth Materials 1 and 2 are plastics products according to the invention. Based on the catheter tube material the silver content was 0.92 wt.-% in material 1 and 1.55 wt.-% in material 2.

Material 3 is a comparison product with activated nanosilver according to WO 2004/024205 with a total silver content of 1.77 wt.-%.

EXAMPLE 8

Partial Reduction with Trisodium Citrate Dihydrate

Silver orthophosphate according to Example 1 was crushed in a mortar in order to comminute any agglomerates formed during drying. 20 g of this $Ag_3PO_4$ was suspended in deionized water and the suspension heated to 98° C. Separately, 12.3 g trisodium citrate dihydrate was dissolved not in 60 ml deionized water and the 98° C. solution was added in one go to the 98° C. suspension. The mixture was stirred for 60 minutes at 98° C. After approx. 10 minutes the first discoloration took place (ochre/brown). As the reaction time increased, the solid became darker. Once 60 minutes had passed, the heating of the reaction vessel was stopped and stirring continued until it cooled to room temperature. The solid was separated by centrifuging. The pH and the electric conductivity were measured in the clean water; pH=7.9 and æ=8.21 mS/cm. The solid was taken up in 500 ml deionized water, washed and separated again. This process was repeated three times. The electric conductivity in the last wash water was below 10 µS/cm, the pH was 8.0.

The separated solid was dried at approx. 90° C. for several hours in a circulating air drying oven.

Chemical analysis: $Ag_{total}$: 77.1%, $Ag^+$: 72.8%, $Ag^0$: 4.3%

EXAMPLE 9 AND COMPARISON EXAMPLE 1

Plastics Equipped with Antimicrobial Properties According to the Invention and According to the State of the Art Additive 1: silver was adsorbed on the barium sulphate according to the process described in Example 7 of WO 2004/024205 and silver phosphate was then produced in statu nascendi. The product from Example 7 of WO 2004/024205 was composed of 91.4 wt.-% barium sulphate, 3.6 wt.-% silver and 5 wt.-% silver phosphate. In the present comparison example 1 the composition of the product differed slightly. In comparison example 1 additive 1 was composed of 90 wt.-% barium sulphate, 5 wt.-% silver and 5 wt.-% silver orthophosphate.

Additive 2: the partly reduced silver orthophosphate produced by reduction with trisodium citrate dihydrate according to example 8 was used in example 9 according to the invention. A mixture of 98 wt.-% barium sulphate and 2 wt.-% partly reduced silver orthophosphate was produced as additive 2.

Additive 1 and additive 2 were incorporated into silicone rubber. A silicone rubber was used which is available in the trade under the name MED 4065 from Nusil Technology, Irvine, Calif. The quantities were chosen such that a product was produced which consisted of 20 wt.-% additive 1 or 2 and 80 wt.-% silicone rubber.

A two-roll mill was used, v=141 mm/s, nip width: 2 mm, slippage=20% at room temperature in 30 passes each, for the incorporation. The thus obtained material was pressed into strands with a diameter of 2.5 mm. These were cured for 4 hours at 150° C. and then dried in the desiccator for 24 hours.

The doped plastics had the following compositions:

Comparison example 1: 80 wt.-% MED 4065 and 20 wt.-% additive 1, i.e. 2 wt.-% silver/silver phosphate based on the doped plastics composition Example 9: 80 wt.-% MED 4065 and 20 wt.-% additive 2, i.e. 0.4 wt.-% partly reduced silver phosphate based on the doped plastics composition In each case 5 ml ultra-pure water were added to 28 units each 1 cm long of the thus-obtained strands in a sample vessel. Together, the 28 units had a surface area of 25 cm² (surface area of one unit: r=0.125 cm, h=1 cm $2\pi r^2 + 2\pi rh = 0.884$ cm²). A ratio of total surface area of the samples to water volume of 25 cm²/5 ml thus resulted. The sample vessels were incubated in a heating cupboard at 38° C. After 1 day, 2 days and then 4, 5, 6, 9, 10, 15 and 16 days, the water was drained off and collected for analysis, and in each case 5 ml ultra-pure water was poured on anew.

The drained-off water was tested for its silver content. Inductively-coupled plasma mass spectrometry was used for this.

The tests were stopped after silver concentration plateaued.

Table 5 below shows the silver concentration measured in each case in ng/cm²/d, i.e. the silver quantity (silver cations) released per day in nanograms per square centimeter of the surface area of the samples.

TABLE 5

| | Silver release (ng/cm²/d) | |
|---|---|---|
| Day | Comparative test 1 | Test 9 |
| 1 | 300 | 360 |
| 2 | 80 | 44 |
| 5 | 56 | 58 |
| 10 | 70 | 22 |
| 16 | | 24 |

The plastic according to the invention in test 9 contained 0.4 wt.-% active ingredient (partly reduced silver orthophosphate) while the plastic according to the state of the art in comparison example 1 had an active-ingredient content (silver and silver phosphate) of 2 wt.-%. The comparison shows that the plastic according to the invention provided a higher initial release of silver cations at one fifth of the active-ingredient concentration. The fall to a sufficient plateau was then quicker.

The plastic according to the invention thus has properties which are particularly advantageous for use in medicinal products. A high initial release is desired in the field of medicine, in order that e.g. germs introduced during implantation are quickly killed off. An adequate, but low, release plateau is advantageous in particular with long-term implants as here the total quantity of released silver must not become too high during the lifetime if toxic effects are to be avoided.

It was surprisingly found that a silver release potential particularly favourable for long-term implants is achieved through the silver orthophosphate partly reduced with citrate. Furthermore the comparison shows that according to the invention, a silver release adequate for the antibacterial effect can be achieved through the silver orthophosphate partly reduced with citrate using much less active ingredient, which is important in particular for consumer products.

The invention claimed is:

1. A process for producing an antimicrobially effective plastics product, wherein said antimicrobially effective plastics product is characterized in that said antimicrobially effective plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver, said process comprising
   (a) provision of a solution of a silver salt in aqueous ammonia,
   (b) addition of phosphoric acid accompanied by precipitation of silver orthophosphate particles as a solid which is contained in suspension until the pH of the suspension lies between 6.0 and 8.0,
   (c) separation of the solid,
   (d) suspension of the solid in deionized water,
   (e) addition of aqueous ammonia to the suspension and heating to a temperature in the range from 40-90° C., wherein the quantity of ammonia is such that, at a chosen temperature in the range from 40-90° C., 1 wt.-% to 80 wt.-% of silver ions dissolve,
   (f) addition of a reductant at the chosen temperature in the range from 40-90° C. in a quantity which is sufficient to reduce the silver ions in solution to metallic silver, with the result that partly reduced silver orthophosphate particles are formed as a solid,
   (g) separation of the solid,
   (h) repeated washing of the solid with portions of deionized water until the specific conductivity at 25° C. of the last portion of wash water after separation of the solid has a value below 20 µS/cm,
   (i) drying of the solid,
   (k) incorporation of the solid into a plastics intermediate product which has not been treated with a colloidal metal or does not contain same, and
   (l) shaping of the plastics product.

2. A process for producing an antimicrobially effective plastics product, wherein said antimicrobially effective plastics product is characterized in that said antimicrobially effective plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver, said process comprising
   (a) provision of a solution of a silver salt in aqueous ammonia,
   (b) addition of phosphoric acid accompanied by precipitation of silver orthophosphate particles as a solid which is contained in suspension until the pH of the suspension lies between 6.0 and 8.0,
   (c) separation of the solid,
   (d) suspension of the solid in deionized water,
   (e) addition of a reductant at a chosen temperature in the range from 40-90° C. in a quantity which is sufficient to reduce 1 wt.-% to 65 wt.-% of the silver orthophosphate contained in the suspension of the solid to metallic silver, with the result that partly reduced silver orthophosphate particles are formed as a solid,
   (f) separation of the solid,
   (g) repeated washing of the solid with portions of deionized water until the specific conductivity at 25° C. of the last portion of wash water after separation of the solid has a value below 20 µS/cm,
   (h) drying of the solid,
   (i) incorporation of the dried solid into a plastics intermediate product which has not been treated with a colloidal metal or does not contain same, and
   (k) shaping of the plastics product.

3. The process according to 2, characterized in that the reductant is selected from sugars, aldehydes, hydroquinone, tartaric acid, salts of citric acid and hydrazine.

4. The process according to claim 3, characterized in that the reductant is glucose.

5. The process according to 2, characterized in that phosphoric acid is added to the suspension of the partly reduced silver orthophosphate before the separation of the solids in order to set a pH in the range from 6.0 to 8.0.

6. The process according to claim 2, characterized in that exclusively ultra-pure water is used.

7. The process according to claim 2, characterized in that the solid is separated by centrifuging.

8. The process according to claim 7, characterized in that the solid is dispersed in ultra-pure water for washing and then separated by centrifuging.

9. The process according to claim 2, characterized in that the dried solid is incorporated into the plastics intermediate product in a quantity of 0.1 wt.-% to 10 wt.-%, based on the total weight of the plastics product.

10. The process according to claim 9, characterized in that the dried solid is incorporated into the plastics intermediate product in a quantity of 0.5 wt.-% to 5 wt.-%.

11. The process according to claim 10, characterized in that the dried solid is incorporated into the plastics intermediate product in a quantity of 1 wt.-% to 3 wt.-%.

12. The process according to claim 2, characterized in that the plastics intermediate product comprises polyurethane, polycarbonate, silicone, polyvinylchloride, polyacrylate, polyester, polyolefin, polystyrene or polyamide.

13. The process according to claim 2, characterized in that the solid is incorporated into the plastics intermediate product after drying without having first been applied to an inorganic support material or an inorganic filler or having been mixed the inorganic support material or the inorganic filler.

14. The process according to claim 2, characterized in that the solid is firstly mixed with an inorganic filler after drying and the mixture is incorporated into the plastics product.

15. The process according to claim 14, characterized in that the organic filler is selected from a material that is poorly soluble in water which is selected from zirconium dioxide, zirconium silicate, titanium dioxide, zinc oxide, calcium fluoride, calcium carbonate, aluminosilicates, hydroxylapatite, fluorapatite, barium sulphate, calcium sulphate and carbon.

16. The process according to claim 2, characterized in that additionally at least one further material which is poorly soluble in water, which is selected from zirconium dioxide, zirconium silicate, titanium dioxide, zinc oxide, calcium fluoride, calcium carbonate, aluminosilicates, hydroxylapatite, fluorapatite, barium sulphate, calcium sulphate and carbon in its various forms, is incorporated into the plastics intermediate product.

17. The process according to claim 2, characterized in that the solid or the solid and at least one further material poorly soluble in water is incorporated into the plastics intermediate product with the help of a mixer, stirrer, kneader, roll mill or extruder.

18. The process according to claim 2, characterized in that the plastics intermediate product is shaped by extrusion, injection moulding, pressing or hot pressing.

19. The process according to claim 2, characterized in that the plastics intermediate product is shaped into a medical catheter after incorporating the solid.

20. The process according to claim 2, characterized in that the plastics intermediate product is applied as a coating to a support made of a different material.

21. The process according to claim 2, characterized in that the solid is not applied to an inorganic support material.

22. The process according to claim 21, characterized in that the solid is not applied to an oxide of titanium, magnesium, aluminium, silicone, cerium, zirconium, hafnium, niobium or tantalum or to a calcium hydroxylapatite, barium sulfate, or mixture thereof.

23. The process according to claim 22, characterized in that the solid is not applied to titanium dioxide.

24. An antimicrobially effective plastics product, obtainable according to the process according to claim 2.

25. The antimicrobially effective plastics product according to claim 24, characterized in that said antimicrobially effective plastics product consists of antimicrobially effective plastic.

26. The antimicrobially effective plastics product according to claim 24, characterized in that at least one part of said antimicrobially effective plastics product consists of antimicrobially effective plastic, and at least one further part of the same consists of a different material.

27. The antimicrobially effective plastics product according to claim 26, characterized in that the different material is selected from metals, glass, ceramic and plastics.

28. The antimicrobially effective plastics product according to claim 26, characterized in that a surface of said antimicrobially effective plastics product consists at least partly of the antimicrobially effective plastic and at least partly of a different material.

29. The antimicrobially effective plastics product according to claim 26, characterized in that the antimicrobially effective plastic encloses the different material, with the result that a surface of the product consists exclusively of the antimicrobially effective plastic.

30. The antimicrobially effective plastics product according to claim 24, which is a catheter.

31. The antimicrobially effective plastics product according to claim 24, characterized in that said antimicrobially effective plastics product is free from an inorganic support material for the solid.

32. The antimicrobially effective plastics product according to claim 31, characterized in that said antimicrobially effective plastics product does not contain as support material for the solid an oxide of titanium, magnesium, aluminium, silicone, cerium, zirconium, hafnium, niobium or tantalum or calcium hydroxylapatite or barium sulphate.

33. The antimicrobially effective plastics product according to claim 32, characterized in that said antimicrobially effective plastics product does not contain titanium dioxide as support material for the solid.

34. A process for producing an antimicrobially effective plastics product, wherein said antimicrobially effective plastics product is characterized in that said antimicrobially effective plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver, said process comprising (a) provision of a solution of a silver salt in aqueous ammonia,
(b) addition of phosphoric acid accompanied by precipitation of silver orthophosphate particles as a solid which is kept in suspension until the pH of the suspension lies between 6.0 and 8.0,
(c) separation of the solid,
(d) repeated washing of the solid with portions of deionized water until the specific conductivity at 25° C. of the last portion of wash water after separation of the solid has a value below 50 µS/cm,
(e) suspension of the solid in deionized water,
(f) addition of aqueous ammonia to the suspension and heating of the mixture to a temperature in the range from 40-90° C., wherein the quantity of ammonia is such that, at a chosen temperature in the range from 40-90° C., 1 wt.-% to 80 wt.-% of silver ions dissolve,
(g) addition of a reductant at the chosen temperature in the range from 40-90° C. in a quantity which is sufficient to reduce the silver ions in solution to metallic silver, with the result that partly reduced silver orthophosphate particles are formed as a solid,
(h) separation of the solid,
(i) repeated washing of the solid with portions of deionized water until the specific conductivity at 25° C. of the last portion of wash water after separation of the solid has a value below 20 µS/cm,
(k) drying of the solid,
(l) incorporation of the solid into a plastics intermediate product which has not been treated with a colloidal metal or does not contain same, and
(m) shaping of the plastics product.

35. A process for producing an antimicrobially effective plastics product, wherein said antimicrobially effective plastics product is characterized in that said antimicrobially effective plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver, said process comprising
- (a) provision of a solution of a silver salt in aqueous ammonia,
- (b) addition of phosphoric acid accompanied by precipitation of silver orthophosphate particles as a solid which is kept in suspension until the pH of the suspension lies between 6.0 and 8.0,
- (c) separation of the solid,
- (d) repeated washing of the solid with portions of deionized water until the specific conductivity at 25° C. of the last portion of wash water after separation of the solid has a value below 50 µS/cm,
- (e) suspension of the solid in deionized water,
- (f) addition of a reductant at a chosen temperature in the range from 40-90° C. in a quantity which is sufficient to reduce 1 wt.-% to 65 wt.-% of the silver orthophosphate contained in the suspension of the solid to metallic silver, with the result that partly reduced silver orthophosphate particles are formed as a solid,
- (g) separation of the solid,
- (h) repeated washing of the solid with portions of deionized water until the specific conductivity at 25° C. of the last portion of wash water after separation of the solid has a value below 20 µS/cm,
- (i) drying of the solid,
- (k) incorporation of the solid into a plastics intermediate product which has not been treated with a colloidal metal or does not contain same, and
- (l) shaping of the plastics product.

36. A process for producing an antimicrobially effective plastics product, wherein said antimicrobially effective plastics product is characterized in that said antimicrobially effective plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver, said process comprising
- (a) provision of a solution of a silver salt in aqueous ammonia solution,
- (b) addition of phosphoric acid accompanied by precipitation of silver orthophosphate particles as a solid which is contained in suspension until the pH of the suspension lies between 6.0 and 8.0,
- (c) separation of the solid,
- (d) repeated washing of the separated solid with portions of deionized water until the specific conductivity at 25° C. of the last portion of wash water after separation from the solid has a value below 50 µS/cm,
- (e) drying of the solid,
- (f) optionally comminuting of the dried solid,
- (g) suspension of the dried solid in deionized water and heating of the suspension to a temperature in the range from 70° C. to 100° C.,
- (h) dissolution of citrate, in deionized water, and heating to a temperature in the range from 70° C. to 100° C., wherein the quantity of citrate is such that it is sufficient to reduce between 1 wt-% and 65 wt-% of the silver orthophosphate contained in the suspension of the comminuted solid to metallic silver,
- (i) addition of the aqueous citrate solution in one portion to the suspension and stirring of the suspension at a temperature in the range from 70° C. to 100° C. accompanied by the formation of partly reduced silver orthophosphate particles as a solid, wherein the temperature is kept in the range by the addition of heat,
- (k) ending of the addition of heat and further stirring of the suspension until this has cooled to room temperature,
- (l) separation of the solid,
- (m) repeated washing of the solid with portions of deionized water until the specific conductivity at 25° C. of the last portion of wash water after separation of the solid has a value below 20 µS/cm,
- (n) drying of the solid,
- (o) incorporation of the solid into a plastics intermediate product which has not been treated with a colloidal metal or does not contain same, and
- (p) shaping of the plastics product.

37. The process according to claim 36, characterized in that the suspension in stage (i) is stirred for 20 minutes to 3 hours at a temperature of 70° C. to 100° C. accompanied by the formation of the partly reduced silver phosphate.

38. The process according to claim 36, characterized in that the temperature in stages (g), (h) and (i) is 90° C. to 100° C.

39. A plastics product, characterized in that said plastics product contains plastic and partly reduced silver orthophosphate particles distributed therein, wherein said partly reduced silver orthophosphate particles each consist of silver orthophosphate and metallic silver, with the result that in each partly reduced silver orthophosphate particle there is a direct contact between said silver orthophosphate and said metallic silver and the surface of each partly reduced silver orthophosphate particle consists partly of said silver phosphate and partly of said metallic silver.

40. The plastics product according to claim 39, characterized in that the partly reduced silver orthophosphate particles each have a ratio of silver ions of the silver orthophosphate to silver atoms of the metallic silver in the range from 95:5 to 55:45.

41. The plastics product according to claim 39, characterized in that the partly reduced silver orthophosphate particles as measured by laser diffraction each have a particle size such that 95 wt.-% of the particles have a size in the range from 0.5 to 50 µm.

42. The plastics product according to claim 41, characterized in that the particle-size distribution has a maximum and the maximum lies in the range from 2 to 20 µm.

43. The plastics product according to claim 39, characterized in that the plastic comprises polyurethane, polycarbonate, silicone, polyvinylchloride, polyacrylate, polyester, polyolefin, polystyrene or polyamide.

44. The plastics product according to claim 39, characterized in that said plastics product consists of plastic in which the partly reduced silver orthophosphate particles are distributed.

45. The plastics product according to claim 39, characterized in that at least a part of said plastics product consists of plastic in which the partly reduced silver orthophosphate particles are distributed, and at least one other part of the same consists of a different material.

46. The plastics product according to claim 45, characterized in that the different material is selected from metals, glass, ceramic and plastics.

47. The plastics product according to claim 45, characterized in that a surface of said plastics product consists at least partly of plastic in which the partly reduced silver orthophosphate particles are distributed and at least partly of a different material.

48. The plastics product according to claim 45, characterized in that the plastic in which the partly reduced silver orthophosphate particles are distributed surrounds the different material, with the result that the surface of the product consists exclusively of this plastic.

49. The plastics product according to claim 39, which is a catheter.

* * * * *